United States Patent
Park et al.

(10) Patent No.: US 7,158,913 B2
(45) Date of Patent: Jan. 2, 2007

(54) AUTOMATIC ACTIVATION OF TOUCH SENSITIVE SCREEN IN A HAND HELD COMPUTING DEVICE

(75) Inventors: Ilwhan Park, Pleasanton, CA (US); Jae H. Shim, San Jose, CA (US); Alex Berelovich, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 942 days.

(21) Appl. No.: 09/775,232

(22) Filed: Jan. 31, 2001

(65) Prior Publication Data

US 2002/0103616 A1 Aug. 1, 2002

(51) Int. Cl.
*G01C 9/00* (2006.01)

(52) U.S. Cl. ....................................................... 702/150
(58) Field of Classification Search ................. 702/150; 708/139; 713/323; 395/182.12; 364/707; 382/103; 363/84; 341/20; 361/794
See application file for complete search history.

(56) References Cited

U.S. PATENT DOCUMENTS

| | | | | | |
|---|---|---|---|---|---|
| 5,133,076 | A | * | 7/1992 | Hawkins et al. | 708/139 |
| 5,539,876 | A | * | 7/1996 | Saito et al. | 713/323 |
| 5,721,930 | A | * | 2/1998 | Kasuga | 713/323 |
| 6,259,172 | B1 | * | 7/2001 | Lee | 307/125 |

* cited by examiner

*Primary Examiner*—John Barlow
*Assistant Examiner*—Tung S Lau

(57) ABSTRACT

Method and system for activating at least one of a display screen and a touch screen, and/or for deactivating a power conservation system for a hand held computing device (PDA, radiotelephone, etc.), when a stylus used for the touch screen is absent from a receptacle that receives the stylus on the device. When the stylus is present in the receptacle, the display screen and/or touch screen are deactivated and/or the power conservation system is activated. When the stylus is absent from the receptacle, but an accumulated time for such absence is greater than a selected time-out value, the system reacts as if the stylus is present in the receptacle. Examples of methods of sensing presence or absence of a stylus in a stylus receptacle are presented.

6 Claims, 2 Drawing Sheets

AUTOMATIC ACTIVATION OF TOUCH SENSITIVE SCREEN IN A HAND HELD COMPUTING DEVICE

FIELD OF THE INVENTION

This invention relates to control of operation of a touch sensitive screen for a portable hand held computing device.

BACKGROUND OF THE INVENTION

Hand held computing devices, such as personal digital assistants ("PDAs") and radiotelephones (collectively referred to as "hand held devices"), have widely adopted touch sensitive screen panels ("touch screens"), overlaid on a display screen, such as a liquid crystal display ("LCD"). A touch screen serves as a data/command input mechanism so that, when a user employs a stylus to touch a touch screen at a selected location, the position of the selected location, alone or relative to the display screen, is identified and processed by a signal processor or its equivalent circuit(s) resident on the hand held device.

A conventional hand held device automatically activates an associated touch screen upon power-up, with the touch screen remaining activated until an explicit power-down. Alternatively, the device deactivates the touch screen by measuring accumulated idle time (usually measured in minutes) since the touch screen was last touched, using a time-out mechanism. Reactivating a touch screen from a deactivated state is performed by pressing one or more keys, such as a power key or other designated key. Some radiotelephones that are equipped with touch screens also activate or deactivate an associated touch screen through flip of a keypad hinged on the device housing so that the touch screen (1) is in an activated mode when the keypad is opened and (2) is in a deactivated mode when the keypad is closed. A conventional hand held device with only a time-out mechanism does not provide adequate protection from accidental activation of the associated touch screen before time-out occurs, through accidental pressing or touching of an activation mechanism while the device is carried in the user's pocket, pocketbook, briefcase or similar container. A time-out mechanism consumes additional battery power, when the device is not in use. Although a hand held device with a flip keypad or a protective cover can prevent accidental activation and can provide some power conservation, a hand held device without a flip keypad or a protective cover cannot.

What is needed is a automatic activation and deactivation mechanism for a touch screen that prevents accidental activation of touch screen components and that conserves battery power by monitoring more closely the present state of the hand held device. Preferably, the activation and deactivation mechanism should be flexible enough to rely on one or on a plurality of state monitoring approaches.

SUMMARY OF THE INVENTION

These needs are met by the invention, which provides a mechanism for activating and deactivating selected touch screen components by detecting whether a stylus associated with the touch screen is present in, or as been removed from, a stylus receiving receptacle, such as a stylus slot. Detection of the presence or absence of the stylus in the receptacle is determined by employing one or more mechanical and/or electrical sensors or switches and comparing a value provided by such a sensor with a reference value, corresponding to presence (or absence) of the stylus in the receptacle. Two or more different sensors can be used to provide a more reliable assessment of the presence or absence of the stylus in the receptacle. A programmable time-out mechanism is optionally provided to deactivate touch screen components when the touch screen itself has not been used for an accumulation time interval having a selected time-out interval value. Accumulation of this time is optionally terminated whenever the system enters or re-enters an "active" state, during which the touch screen is used the (optional) key pad is used and/or the device receives a communication from a signal source spaced apart from the device.

DESCRIPTION OF BEST MODES OF THE INVENTION

Figure 1:
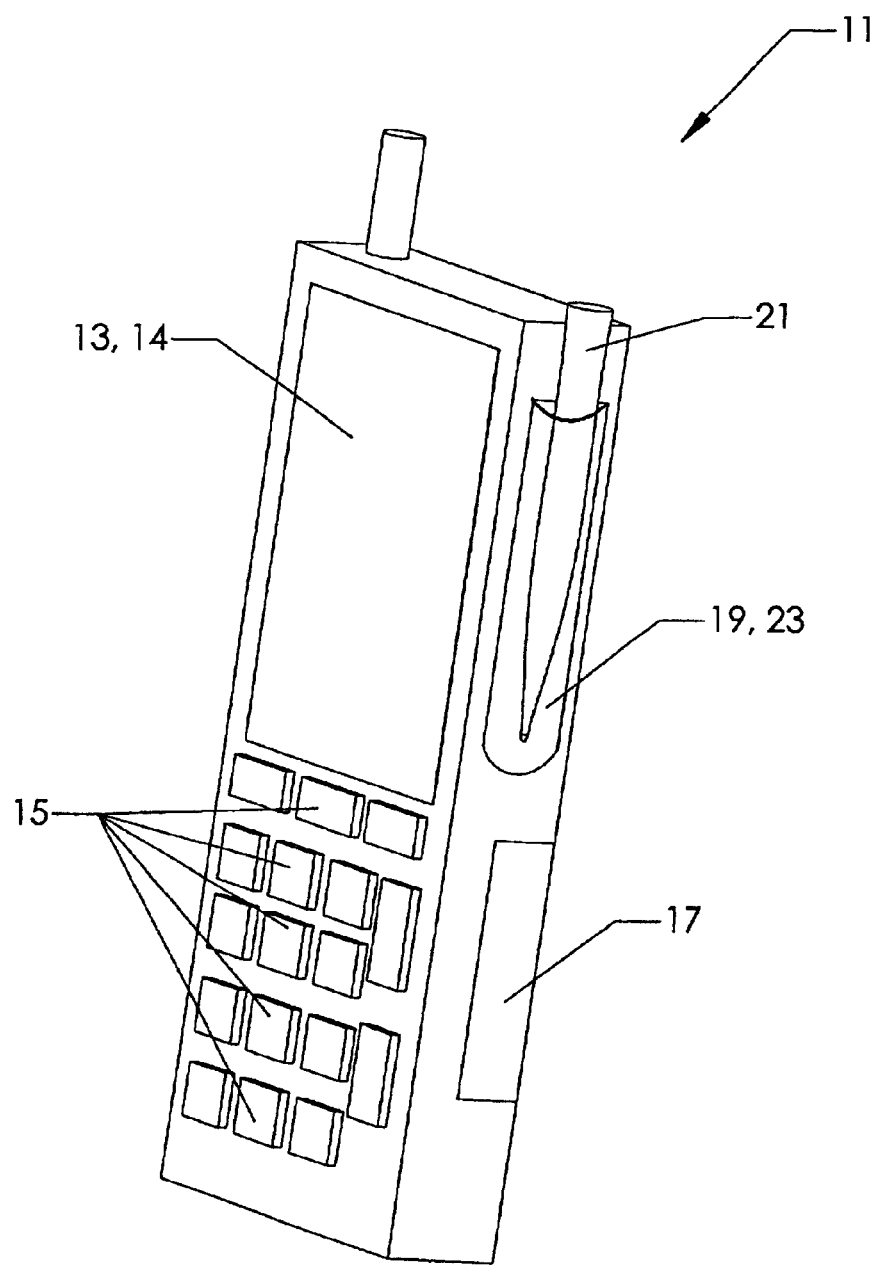
FIG. 1 is a perspective view of a hand held device constructed according to the invention.

FIG. 1 illustrates practice of the invention in one embodiment. A hand held electronics device 11, according to the invention, includes a touch screen 13, including an associated display screen 14, an optional keypad 15, an electronic signal processing module (including a power conservation module and a time accumulation module) 17, a stylus receptacle (slot or other stylus-receiving site on the device 11) 19, a selected stylus 21 and a stylus sensor 23 that communicates with the signal processing module 17.

When the stylus sensor 23 senses that the stylus 21 is present in the stylus receptacle 19, the stylus sensor provides a first stylus signal for the signal processing module 17 that results in one or more of the following three actions: (1) the display screen 14 is deactivated or turned off; (2) electronics that control response of the touch screen 13 is (partly or fully) turned off or deactivated; and (3) a power conservation system, controlled by the signal processing module 17, is activated or turned on. When the stylus sensor 23 senses that the stylus 21 is not present in the stylus receptacle 19, the stylus sensor provides a second stylus signal for the signal processing module 17 that results in one or more of the following three actions: (1) the display screen 14 is activated; (2) electronics that control response of the touch screen 13 is activated; (3) a power conservation system, controlled by the signal processing module 17, is deactivated.

The stylus sensor 23 senses the presence or absence of the stylus 21 in the stylus receptacle 19 by one or more of the following procedures:

(1) an impedance for the stylus receptacle 19 (with or without the stylus being present) is measured, and the measured impedance value is compared with at least one of (i) a first impedance value Z1 corresponding to presence of the stylus 21 in the stylus receptacle 19 and (ii) a second impedance value Z2 corresponding to absence of the stylus 21 in the stylus receptacle 19;

(2) an electrical conductivity for the stylus receptacle 19 (with or without the stylus being present) is measured and compared with at least one of: (iii) a first conductivity value g1 corresponding to the presence of the stylus 21 in the stylus receptacle 19 and (iv) a second conductivity value g2 corresponding to absence off the stylus 21 in the receptacle 19;

(3) an electrical capacitance (or associated dielectric value) for the stylus receptacle 19 (with or without the stylus being present) is measured and compared with at least one of: (iii) a first capacitance value C1 corresponding to the presence of the stylus 21 in the stylus receptacle 19 and (iv) a second capacitance value C2 corresponding to absence off the stylus 21 in the receptacle 19;

(4) a mass associated with the receptacle 21 is measured and compared with at least one of (v) a first mass value m1 corresponding to the presence of the stylus 21 in the stylus receptacle 19 and (vi) a second mass value m2 corresponding to absence off the stylus 21 in the receptacle 19;

(5) an electromechanical switch, such as a mercury switch or similar switch, associated with the receptacle 21 to sense the presence of the stylus and enter a first state, and to sense the absence of the stylus and enter a second state;

(6) an electromagnetic sensor, such as a Hall effect proximity sensor, that senses proximity, or absence of proximity, of a ferromagnetic component embedded in the stylus; and (7) an electro-optical sensor that issues light in a selected wavelength range and receives and senses light in this range reflected from a light-reflecting component embedded in the stylus, when the stylus is present in the receptacle, or when the stylus is absent from the receptacle.

Other comparison tests can also be used for determining whether the stylus is present in or absent from the receptacle. Preferably, more than one comparison test is used for such purpose. For example, two tests (e.g., tests number 1 and 4) may be applied and the result of each test compared. If both tests indicate that the stylus is present, or both tests indicate that the stylus is absent, the common result of the tests is accepted. If the two tests indicate opposite results, a third test (e.g., test number 2) is applied, and the test result indicated by at least two of the tests is accepted as the conclusion, using majority voting.

Figure 2:
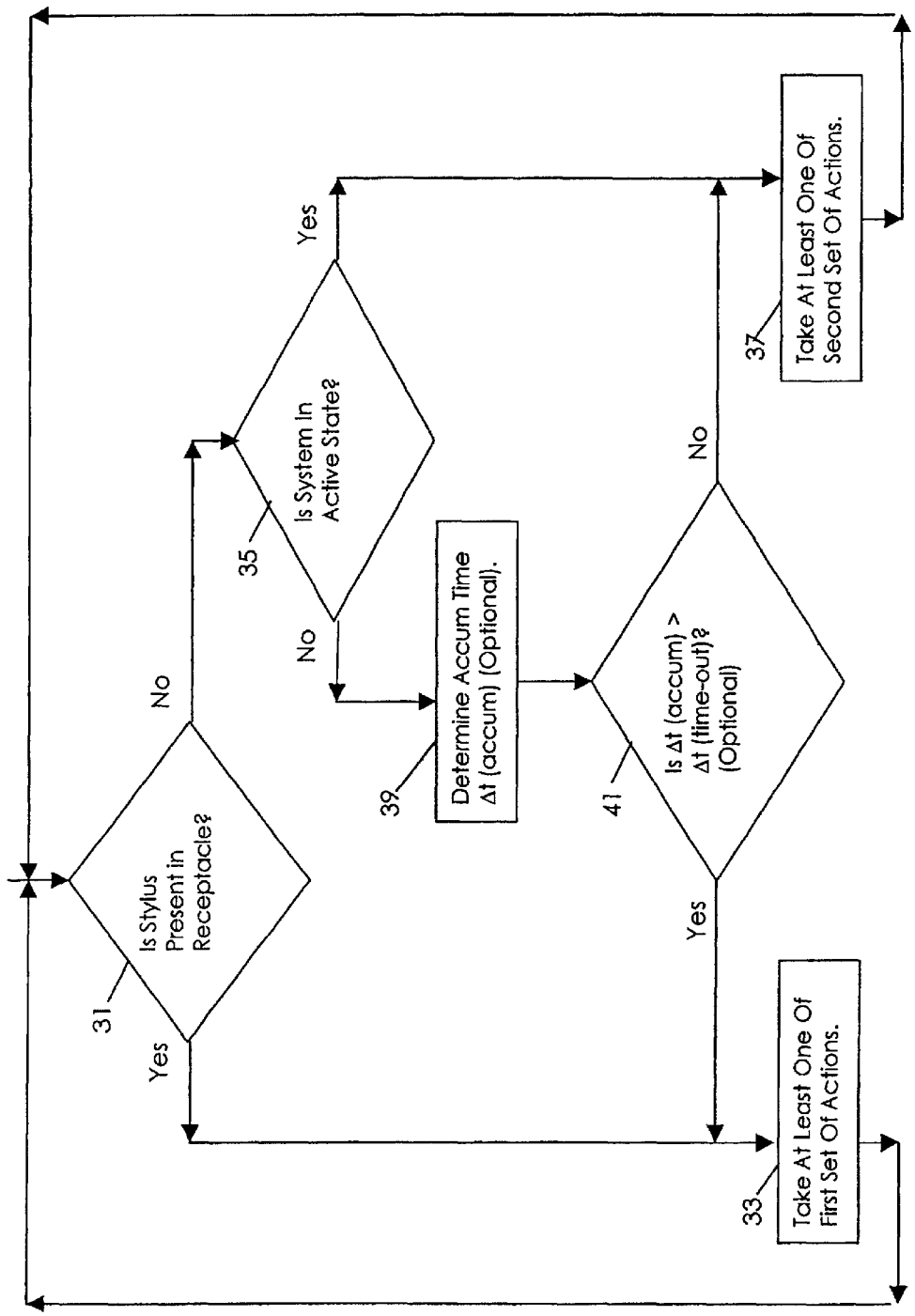
FIG. 2 is a flow chart of a procedure for practising the invention.

FIG. 2 is a flow chart of a procedure for practising the invention. In step 31, a stylus sensor determines if the stylus is present in the stylus receptacle, using one or more of the comparison tests discussed in the preceding. If the answer to the query in step 31 is "yes," the system moves to step 33 and takes one or more of the following first set of actions: (1) the display screen 14 is deactivated or turned off (if not already off); (2) electronics that control response of the touch screen 13 is (partly or fully) turned off or deactivated (if not already off); and (3) a power conservation system, controlled by the signal processing module 17, is activated or turned on (if not already on). The system then returns to step 31.

If the answer to the query in step 31 is "no," the system moves to step 35 and determines if the system is in an "active" state. The system is in an "active" state if: (1) the touch screen is being used, (2) a keypad (optional) is being used, (3) the device is receiving a communication from a signal source spaced apart from the device. If the answer to the query in step 35 is "yes," the system moves to step 37 and takes at least one of the following second set of actions: (1) the display screen 14 is activated (if not already on); (2) electronics that control response of the touch screen 13 is activated (if not already on); (3) a power conservation system, controlled by the signal processing module 17, is deactivated (if not already off). The system then returns to step 31.

If the answer to the query in step 35 is "no," the system moves to step 39 (optional) and determines an accumulated time Δ t(accum) during which the device has never been in an active state. In step 41 (optional), the system determines if the accumulated time β t(accum) is greater than a selected accumulation time Δ t(time-out). If the answer to the query in step 41 is "yes," the system moves to step 33, takes at least one of the first set of actions, and returns to step 31. If the answer to the query in step 41 is "no," the system moves to step 37, takes at least one of the second set of actions and returns to step 31.

What is claimed is:

1. A method of operating a hand held computing device, the method comprising:

providing a hand held computing device with an electrical power conservation system, with an LCD display, with a touch sensitive screen and with a stylus for use in entering information into the computing device through the touch screen;

sensing whether the stylus is positioned in a stylus receiving receptacle provided on the device by a process comprising at least one of the following actions:

(a) comparing an impedance measured for said receptacle with an impedance value associated with said receptacle when said stylus is positioned within said receptacle;

(b) comparing an electrical conductivity measured for said receptacle with an electrical conductivity value associated with said receptacle when said stylus is positioned within said receptacle;

(c) comparing a capacitance measured for said receptacle with a capacitance value associated with said receptacle when said stylus is positioned within said receptacle;

(d) comparing a mass measured for said receptacle with a mass value associated with said receptacle when said stylus is positioned within said receptacle;

(e) determining if an electromechanical switch associated with said receptacle is in a selected switch state when said stylus is positioned within said receptacle;

(f) determining if an electromagnetic sensor associated with said receptacle senses proximity of a selected ferromagnetic component embedded in said stylus when said stylus is positioned within said receptacle; and (g) determining if light in a selected wavelength range is received by an optical sensor associated with said receptacle when said stylus is positioned within said receptacle; and when the stylus is positioned within the receptacle, taking at least one of the following set of actions: (i) deactivating the touch screen; (ii) deactivating the LCD display; and (iii) activating the power conservation system.

2. The method of claim 1, further comprising:

when said stylus is not positioned within said receptacle, taking at least one of the following actions: (iv) activating said touch screen for entry of information; (v) activating said LCD display; and (vi) deactivating said power conservation system.

3. The method of claim 1, further comprising:

when said stylus is not positioned within said receptacle:

determining if said system is presently in an active state;

when said system is presently in an active state, taking at least one of the following actions: (iv) activating said touch screen for entry of information; (v) activating said LCD display; and (vi) deactivating said power conservation system;

when said system is not presently in an active state, determining an accumulated time during which said stylus has continuously not been within said receptacle and said device has not been in an active state, and comparing the accumulated time with a selected time-out value;

when the accumulated time is greater than the time-out value, taking at least one of said actions (i), (ii) and (iii);

when the accumulated time is not greater than the time-out value, taking at least one of the actions (iv), (v) and (vi).

4. A system of operating a hand held computing device, the system comprising:

a hand held computing device having a electrical power conservation system, an LCD display, a touch sensitive screen and a stylus for use in entering information into the computing device through the touch screen;

a stylus sensor that is configured for sensing whether the stylus is positioned in a stylus receiving receptacle provided on the system by a process comprising at least one of the following actions:

(a) comparing an impedance measured for said receptacle with an impedance value associated with said receptacle when said stylus is positioned within said receptacle;

(b) comparing an electrical conductivity measured for said receptacle with an electrical conductivity value associated with said receptacle when said stylus is positioned within said receptacle;

(c) comparing a capacitance measured for said receptacle with a capacitance value associated with said receptacle when said stylus is positioned within said receptacle;

(d) comparing a mass measured for said receptacle with a mass value associated with said receptacle when said stylus is positioned within said receptacle;

(e) determining if an electromechanical switch associated with said receptacle is in a selected switch state when said stylus is positioned within said receptacle;

(f) determining if an electromagnetic sensor associated with said receptacle senses proximity of a selected ferromagnetic component embedded in said stylus when said stylus is positioned within said receptacle; and (g) determining if light in a selected wavelength range is received by an optical sensor associated with said receptacle when said stylus is positioned within said receptacle; and a computer that is programmed so that, when the stylus is positioned within the receptacle, the system takes at least one of the following set of actions: (i) deactivating the touch screen; (ii) deactivating the LCD display; and (iii) activating the power conservation system.

5. The system of claim 4, wherein said computer is programmed so that, when said stylus is not positioned within said receptacle, said system takes at least one of the following actions: (iv) activating said touch screen for entry of information; (v) activating said LCD display; and (vi) deactivating said power conservation system.

6. The system of claim 4, wherein said computer is programmed so that, when said stylus is not positioned within said receptacle:

said computer determines if said system is presently in an active state;

when said system is presently in an active state, said system takes at least one of the following actions: (iv) activating said touch screen for entry of information; (v) activating said LCD display; and (vi) deactivating said power conservation system;

when said system is not presently in an active state, said computer determines an accumulated time during which said stylus has continuously not been within said receptacle and said device has not been in an active state, and said computer compares the accumulated time with a selected time-out value;

when the accumulated time is greater than the time-out value, said system takes at least one of said actions (i), (ii) and (iii);

when the accumulated time is not greater than the time-out value, said system takes at least one of the actions (iv), (v) and (vi).

* * * * *